(12) United States Patent
Miyasaka

(10) Patent No.: US 8,977,782 B2
(45) Date of Patent: *Mar. 10, 2015

(54) ELECTRONIC DEVICE AND CONTROL METHOD THEREOF

(75) Inventor: Masayo Miyasaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/943,686

(22) Filed: Nov. 10, 2010

(65) Prior Publication Data

US 2011/0113162 A1    May 12, 2011

(30) Foreign Application Priority Data

Nov. 11, 2009  (JP) .................................. 2009-257796
Jun. 17, 2010  (JP) .................................. 2010-137998

(51) Int. Cl.
| G06F 3/00 | (2006.01) |
| G06F 5/00 | (2006.01) |
| G06F 13/40 | (2006.01) |
| G06K 15/00 | (2006.01) |

(52) U.S. Cl.
CPC .......... *G06F 13/4022* (2013.01); *G06F 13/409* (2013.01); *G06K 15/00* (2013.01)
USPC .................................. 710/11; 710/36; 710/38

(58) Field of Classification Search
None
See application file for complete search history.

(56) References Cited

U.S. PATENT DOCUMENTS

| 5,517,630 | A | 5/1996 | Tasaki |
| 6,857,034 | B1 | 2/2005 | DiSanza et al. |
| 7,346,729 | B2 | 3/2008 | Watanabe |
| 7,552,362 | B2 | 6/2009 | Fukui et al. |
| 7,849,234 | B2 * | 12/2010 | Lin et al. .......................... 710/15 |
| 2003/0097467 | A1 * | 5/2003 | Sano .............................. 709/238 |
| 2003/0115302 | A1 | 6/2003 | Teraoaka et al. |
| 2003/0123074 | A1 | 7/2003 | Imai et al. |
| 2003/0210418 | A1 | 11/2003 | Aizawa |
| 2004/0189808 | A1 | 9/2004 | Tanaka |
| 2004/0225816 | A1 * | 11/2004 | Leigh et al. ................... 710/305 |

(Continued)

FOREIGN PATENT DOCUMENTS

| EP | 820185 A2 * | 1/1998 |
| EP | 1 150 244 A2 | 10/2001 |

(Continued)

OTHER PUBLICATIONS

Adaptec SCSI Card 29320LPE, http://www.adaptec.com/en-us/support/scsi/u320/asc-29320Ipe/, Feb. 2007.*

(Continued)

*Primary Examiner* — Kris Rhu

(57) ABSTRACT

An electronic device is connectable to an external device. An interface substrate is detachably connected to a main substrate. A first interface is installed on the interface substrate, and the first interface is connectable to the external device. A second interface is installed on the main substrate, and the second interface is connectable to the external device. A selection unit selects one interface of the first interface on the interface substrate and the second interface on the main substrate. A communication unit communicates information with the external device through the interface selected by the selection unit. At least one of the first interface and the second interface is configured to detect a connection state to the external device. The selection unit selects an interface which is designated or preferentially selects an interface which detects a connection to the external device.

10 Claims, 8 Drawing Sheets

(56) References Cited

U.S. PATENT DOCUMENTS

| | | | |
|---|---|---|---|
| 2005/0213149 A1* | 9/2005 | Kuwahara | 358/1.15 |
| 2006/0265538 A1* | 11/2006 | Oh et al. | 710/300 |
| 2007/0214301 A1* | 9/2007 | Chen | 710/301 |
| 2007/0245057 A1 | 10/2007 | Bohm et al. | |
| 2010/0030925 A1 | 2/2010 | Inoue | |
| 2011/0093642 A1* | 4/2011 | Miyasaka | 710/316 |

FOREIGN PATENT DOCUMENTS

| | | |
|---|---|---|
| EP | 2 312 450 A1 | 4/2011 |
| JP | 11-237936 A | 8/1999 |
| JP | 2000-353145 A | 12/2000 |
| JP | 2001-051911 A | 2/2001 |
| JP | 2001-060961 A | 3/2001 |
| JP | 2001-184296 A | 7/2001 |
| JP | 2001-296939 A | 10/2001 |
| JP | 2002-200819 A | 7/2002 |
| JP | 2002-347311 A | 12/2002 |
| JP | 2008-126525 A | 6/2008 |

OTHER PUBLICATIONS

Release notes for the ASC-29320LPE, Feb. 27, 2007, Adaptec, http://download.adaptec.com/pdfs/readme/relnotes_29320lpe.pdf.*

Belkin Hi-Speed USB 2.0 5-Port PCI Card, www.amazon.com/Belkin-Hi-Speed-USB-5-Port-Card/dp/B000E6HGX0, Aug. 7, 2008.*

National Instruments, Aug. 24, 2007, http://digital.ni.com/public.nsf/allkb/1C8F13D0806056F886256FAC00649176.*

Fischer, Wayne, IEEE Explore, IEEE Standard for a Common Mezzanine Card (CMC) Family, XP-002621055, vol. 1386-2001, pp. 1-48, Aug. 20, 2001.

Extended European Search Report, Application No. 10 19 0422, dated Dec. 21, 2011.

Megaplus, USB 2.0 controller Welland U-PCI-v2. 0-5, Apr. 16, 2001.

Extended European Search Report, EP application No. 10187434.5, Mar. 11, 2011.

* cited by examiner

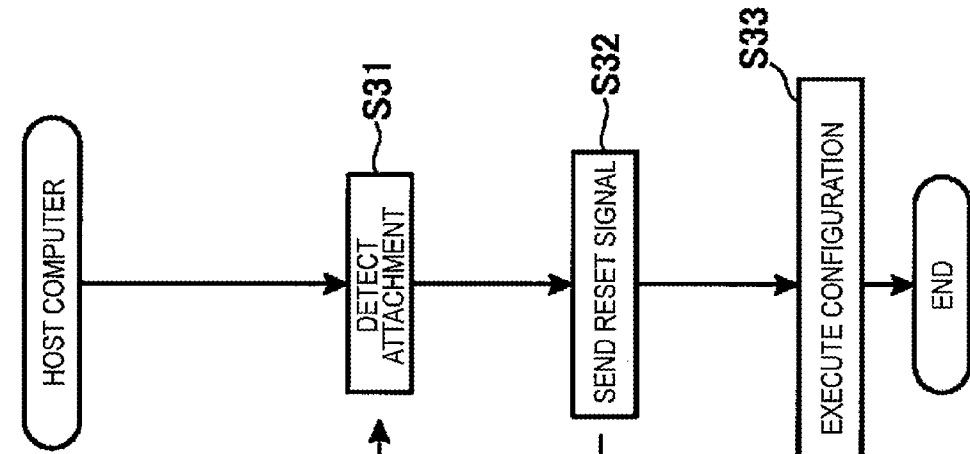
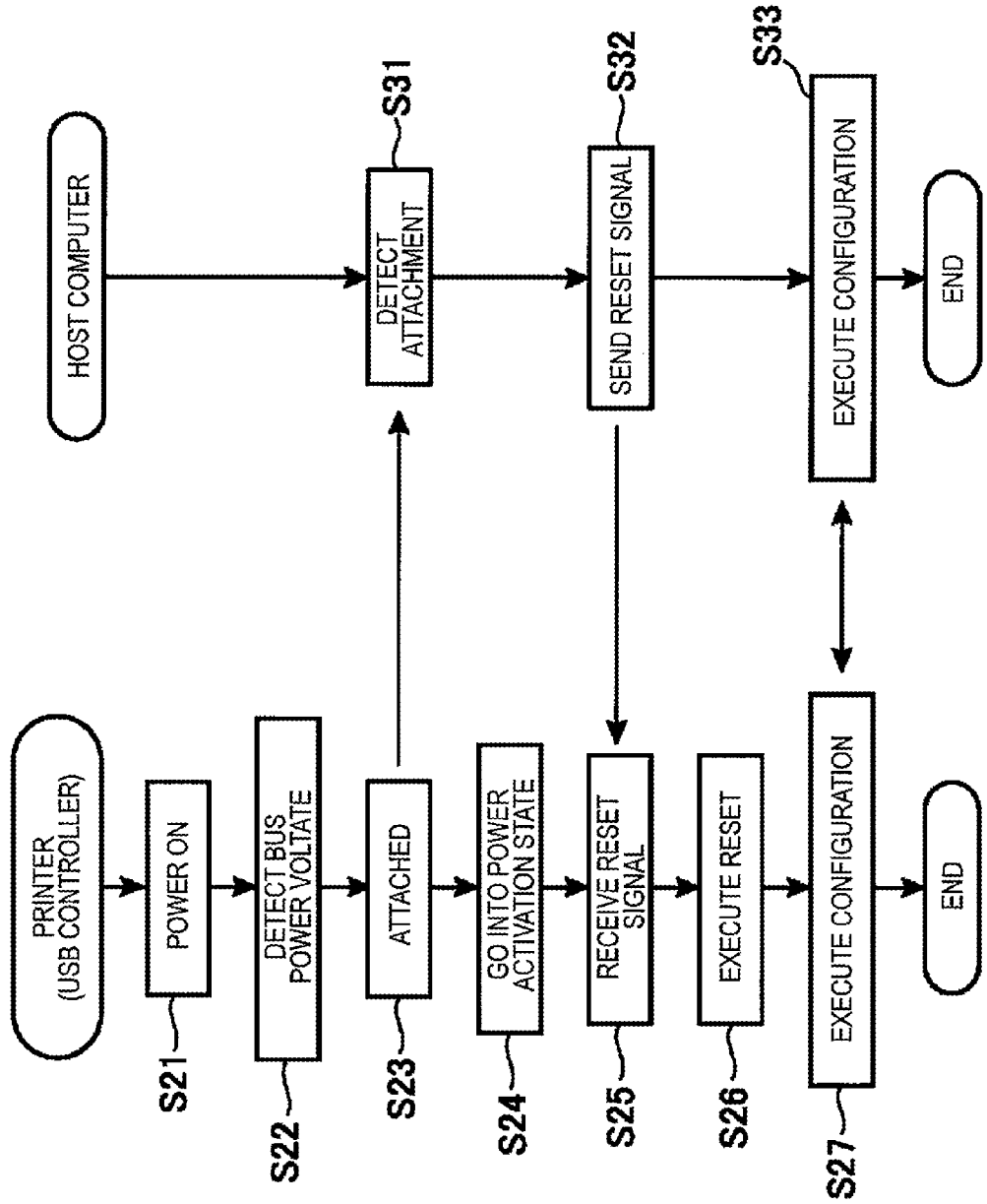

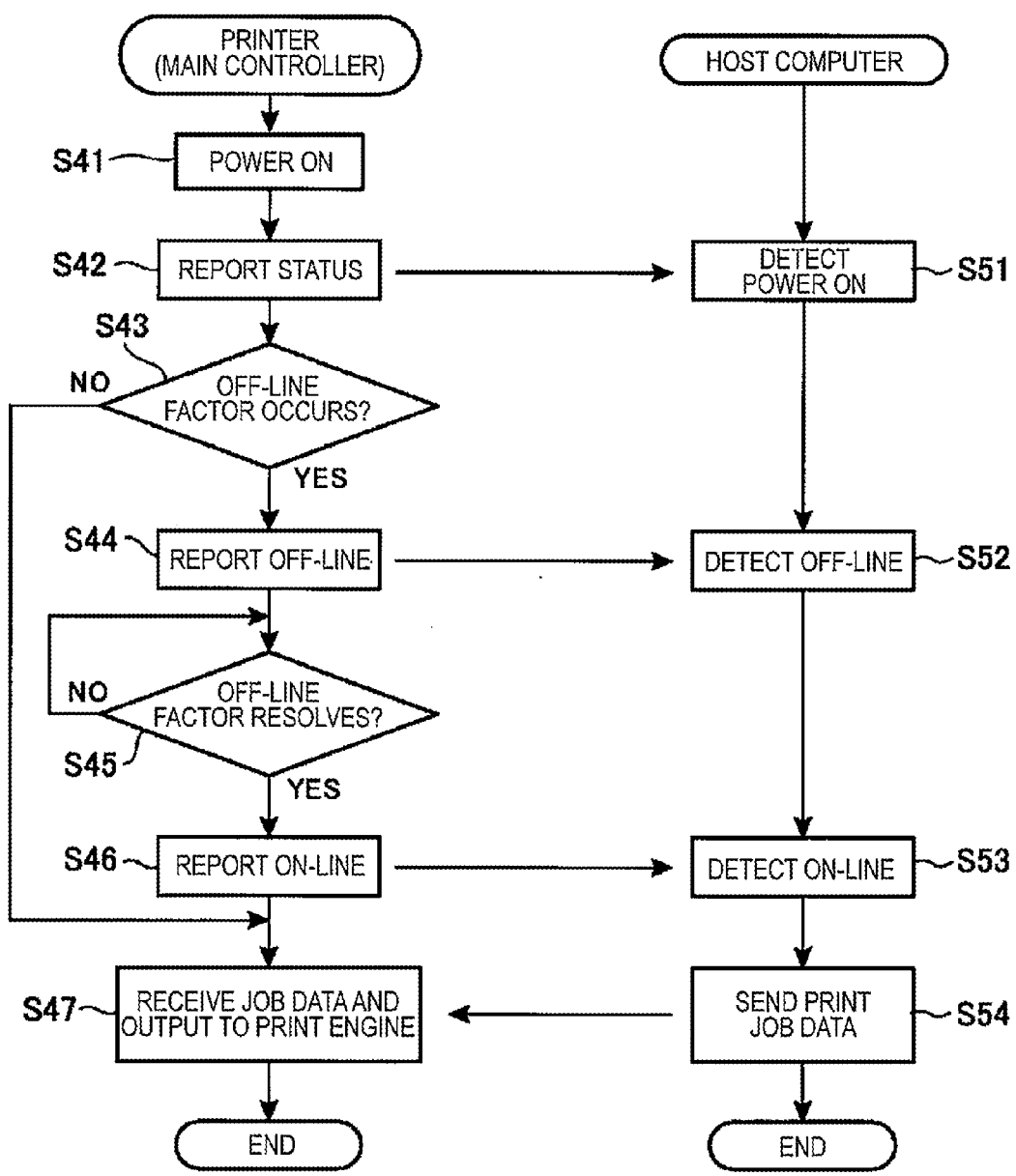

ELECTRONIC DEVICE AND CONTROL METHOD THEREOF

The disclosures of Japanese Patent Application No. 2009-257796 filed on Nov. 11, 2009 and Japanese Patent Application No. 2010-137998 filed on Jun. 17, 2010, including specifications, drawings and claims are incorporated herein by reference in its entirety.

BACKGROUND

The present invention relates to an electronic device connected to an external device and a control method thereof.

Conventionally, there is known an electronic device such as a printer connected to an external device through an interface such as USB (Universal Serial Bus). Although such a device is normally connected to an external device in one-to-one correspondence, there is also known a configuration in which a plurality of external devices are connected to one electronic device by, for example, switching the connections by a USB switcher (For example, see Patent Document 1).

[Patent Document 1] JP-A-2000-353145

As described in Patent Document 1, as a possible method of connecting an electronic device to a plurality of external devices, switching of the external devices is performed to make any one of the external devices communicatable with the electronic device in one-to-one correspondence. In addition, a plurality of interfaces are provided in the electronic device itself to make any one of the external devices communicatable with the electronic device in one-to-one-correspondence with use of one of the interfaces. However, it is difficult to appropriately select one interface from the plurality of interfaces, and thus there is a demand for a scheme for efficiently selecting one interface.

SUMMARY

It is therefore an object of at least one embodiment of the present invention to make an electronic device including a plurality of interfaces to be connected to an external device rapidly and efficiently select one interface.

In order to achieve at least one of the above-described objects, according to a first aspect of the embodiments of the present invention, there is provided an electronic device which is connectable to an external device, comprising: a main substrate; an interface substrate which is detachably connected to the main substrate in the electronic device; a first interface which is installed on the interface substrate, the first interface which is connectable to the external device; a second interface which is installed on the main substrate, the second interface which is connectable to the external device, a selection unit that selects one interface of the first interface on the interface substrate and the second interface on the main substrate; and a communication unit that communicates information with the external device through the interface selected by the selection unit, wherein at least one of the first interface and the second interface is configured to detect a connection state to the external device, and wherein the selection unit selects an interface which is designated or preferentially selects an interface which detects a connection to the external device.

According to the above configuration, the first interface connectable to the external device is provided on the interface substrate and the second interface connectable to the external device is provided on the main substrate. The election unit that that selects one of the first and second interfaces selects an interface which is pre-designated or preferentially selects an interface which detects a connection to the external device when the interface is detectable of a connection state to the external device. Therefore, the interface which is designated or the interface to which the user actually connects the external device is selected by using a function of the interface which is detectable of the connection state to the external device, and thus it is possible to rapidly and efficiently select the interface at a necessary side to perform communication with the external device.

The electronic device may further comprise a switch that designates one interface of the first interface and the second interface, or a storage unit that stores information for designating one interface of the first interface and the second interface, and the selection unit may acquire designation information of the switch or the storage unit when the electronic device is powered on or when receiving a reset command or a reset signal from the external device and the selection unit may select the interface which is designated by the designation information.

According to the above configuration, the interface to be selected from the first interface and the second interface can be easily designated by the switch or the designated information stored in the storage unit.

In the above-described electronic device, when receiving a predetermined command including designation information for designating one interface of the first interface and the second interface, the selection unit may select the interface which is designated by the designation information in the predetermined command.

According to the above configuration, by sending the command from the external device, the interface to be selected from the first and second interfaces can be easily designated.

In the above-described electronic device, the selection unit may select the second interface when the first interface is designated by the designation information of the switch or the storage unit and the interface substrate is not connected to the main substrate.

According to the above configuration, in the case where the external device is unable to be connected to the pre-designated interface, the other interface is selected to be communicatable with the external device. For example, even in the case where the designated interface substrate is not connected due to maintenance circumstances or an operational error, the connection to the external device can be made by the other interface. Accordingly, in the case where the selection of the designated interface is not possible, another interface is selected regardless of the designation, and thus the possibility of connection to the external device is constantly maintained.

In the above-described electronic device, both of the first interface and the second interface may be configured to detect a connection state to the external device, and the selection unit may preferentially select an interface in which the connection to the external device is first detected.

According to the above configuration, the interface which first detects the external device is selected, and thus it is possible to rapidly select the interface to be communicatable with the external device.

The electronic device may further comprise a control unit, and when the electronic device is powered on or when receiving a reset command or a reset signal from the external device if one interface which is configured to detect a connection state to the external device does not detect the connection to the external device, the control unit may make another interface go into a state where statues information can be reported to the external device to report the status information including information of an off-line factor from both of the one interface and the another interface to the external device when the off-line factor occurs.

According to the above configuration, it is possible to rapidly detect the connection even when the external device is connected to any one of the first and second interfaces when one of the first and second interfaces is configured to be detectable of the connection state to the external device. When the off-line factor occurs before detecting the connection of the external device, the status report signal including the off-line state is reported to all interfaces. Even when the external device is connected but undetected, the off-line can be accurately reported to the external device. Thus, it is possible to avoid a situation in which the data is input from the external device in the off-line state and to reliably detect the connection after returning to the on-line state.

According to a second aspect of the embodiments of the present invention, there is provided a method of controlling an electronic device which is connectable to an external device, the external device including: a main substrate; an interface substrate which is detachably connected to the main substrate in the electronic device; a first interface which is installed on the interface substrate, the first interface which is connectable to the external device; and a second interface which is installed on the main substrate, the second interface which is connectable to the external device, wherein at least one of the first interface and the second interface is configured to detect a connection state to the external device, the method comprising: selecting an interface which is designated or preferentially selecting an interface which detects a connection to the external device, between the first interface on the interface substrate and the second interface on the main substrate; and communicating information with the external device through the selected interface.

According to the above configuration, the first interface connectable to the external device is provided on the interface substrate and the second interface connectable to the external device is provided on the main substrate. The election unit that that selects one of the first and second interfaces selects an interface which is pre-designated or preferentially selects an interface which detects a connection to the external device when the interface is detectable of a connection state to the external device. Therefore, the interface which is designated or the interface to which the user actually connects the external device is selected by using a function of the interface which is detectable of the connection state to the external device, and thus it is possible to rapidly and efficiently select the interface at a necessary side to perform communication with the external device.

The electronic device may further include a switch that designates one interface of the first interface and the second interface, or a storage unit that stores information for designating one interface of the first interface and the second interface, the method may further comprise acquiring designation information of the switch or the storage unit when the electronic device is powered on or when receiving a reset command or a reset signal from the external device, and the interface which is designated by the designation information may be selected in the selecting.

According to the above configuration, the interface to be selected from the first interface and the second interface can be easily designated by the switch or the designated information stored in the storage unit.

When receiving a predetermined command including designation information for designating one interface of the first interface and the second interface, the interface which is designated by the designation information in the predetermined command may be selected in the selecting.

According to the above configuration, by sending the command from the external device, the interface to be selected from the first and second interfaces can be easily designated.

The second interface is selected in the selecting when the first interface is designated by the designation information of the switch or the storage unit and the interface substrate is not connected to the main substrate.

According to the above configuration, in the case where the external device is unable to be connected to the pre-designated interface, the other interface is selected to be communicatable with the external device. For example, even in the case where the designated interface substrate is not connected due to maintenance circumstances or an operational error, the connection to the external device can be made by the other interface. Accordingly, in the case where the selection of the designated interface is not possible, another interface is selected regardless of the designation, and thus the possibility of connection to the external device is constantly maintained.

Both of the first interface and the second interface may be configured to detect a connection state to the external device, and an interface in which the connection to the external device is first detected may be preferentially selected in the selecting.

According to the above configuration, the interface which first detects the external device is selected, and thus it is possible to rapidly select the interface to be communicatable with the external device.

The method may further comprise: when the electronic device is powered on or when receiving a reset command or a reset signal from the external device if one interface which is configured to detect a connection state to the external device does not detect the connection to the external device, making another interface go into a state where statues information can be reported to the external device, and reporting the status information including information of an off-line factor from both of the one interface and the another interface to the external device when the off-line factor occurs.

According to the above configuration, it is possible to rapidly detect the connection even when the external device is connected to any one of the first and second interfaces when one of the first and second interfaces is configured to be detectable of the connection state to the external device. When the off-line factor occurs before detecting the connection of the external device, the status report signal including the off-line state is reported to all interfaces. Even when the external device is connected but undetected, the off-line can be accurately reported to the external device. Thus, it is possible to avoid a situation in which the data is input from the external device in the off-line state and to reliably detect the connection after returning to the on-line state.

According to a third aspect of the embodiments of the present invention, there is provided a program causing a controller of an electronic device to execute a method of controlling the electronic device which is connectable to an external device, the electronic device including: a main substrate; an interface substrate which is detachably connected to the main substrate in the electronic device; a first interface which is installed on the interface substrate, the first interface which is connectable to the external device; and a second interface which is installed on the main substrate, the second interface which is connectable to the external device, wherein at least one of the first interface and the second interface is configured to detect a connection state to the external device, the method comprising: selecting an interface which is designated or preferentially selects an interface which detects a connection to the external device, between the first interface on the interface substrate and the second interface on the main substrate; and communicating information with the external device through the selected interface.

According to the above configuration, the first interface connectable to the external device is provided on the interface substrate and the second interface connectable to the external device is provided on the main substrate. The election unit that that selects one of the first and second interfaces selects an interface which is pre-designated or preferentially selects an interface which detects a connection to the external device when the interface is detectable of a connection state to the external device. Therefore, the interface which is designated or the interface to which the user actually connects the external device is selected by using a function of the interface which is detectable of the connection state to the external device, and thus it is possible to rapidly and efficiently select the interface at a necessary side to perform communication with the external device.

According to the aspects of the embodiments of the present invention, in a configuration in which a plurality of interfaces to which the external device can be connected are provided, the interface at a necessary side can be rapidly and effectively selected by using a function of the interface which is detectable of the connection state to the external device to execute the communication with the external device.

BRIEF DESCRIPTION OF THE DRAWINGS

In the accompanying drawings:

FIGS. 3A and 3B are flow charts illustrating an example of the operation of the printer;

FIGS. 4A and 4B are flowcharts illustrating an example of the operation of the printer;

DETAILED DESCRIPTION OF THE EMBODIMENTS

Hereinafter, preferred embodiments of the present invention will be described with reference to the accompanying drawings.

First Embodiment

Figure 1:
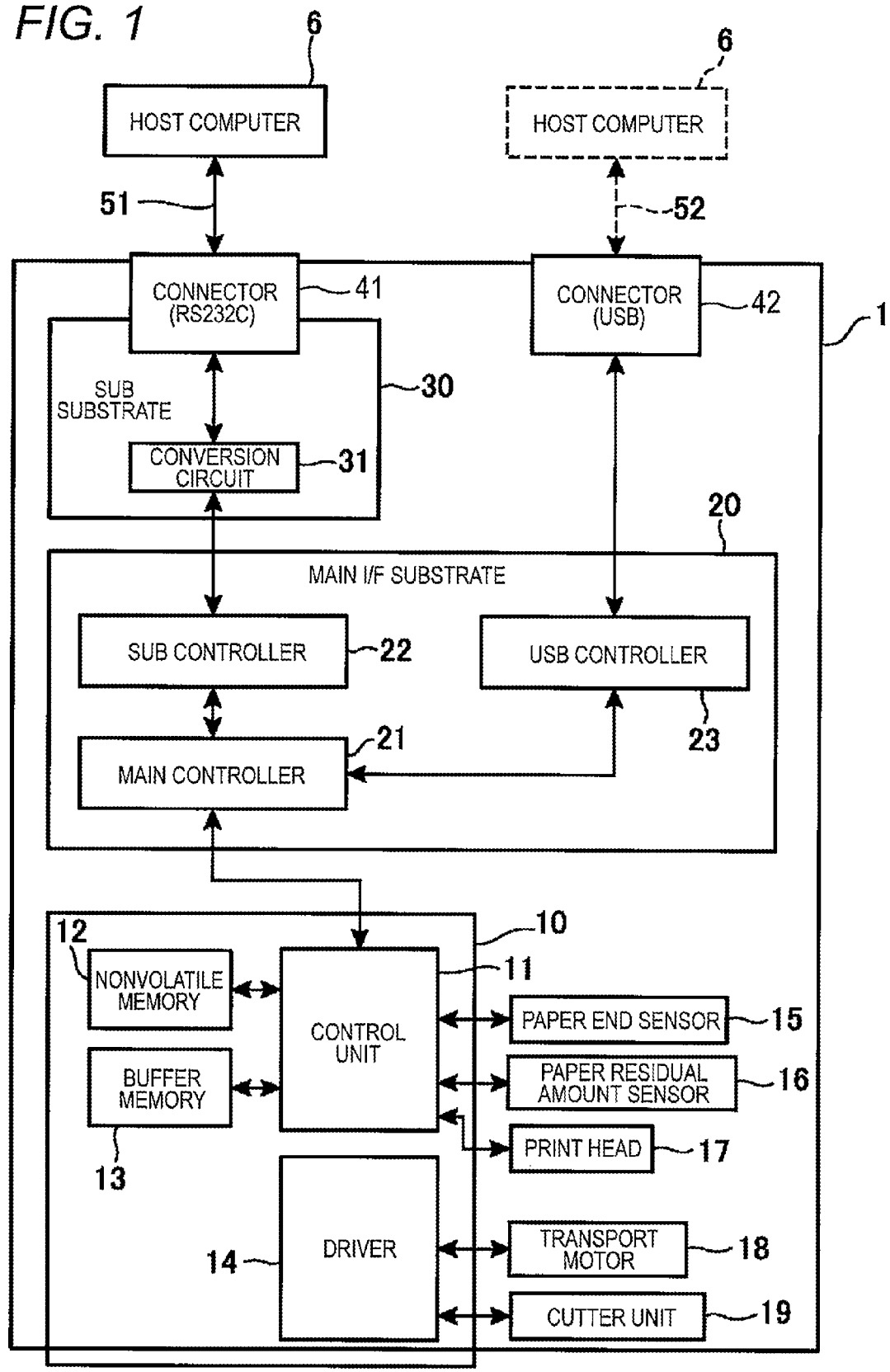
FIG. 1 is a block diagram illustrating a configuration of a printer according to a first embodiment of the present invention.

FIG. 1 is a block diagram illustrating the configuration of a printer 1 as an electronic device according to a first embodiment of the present invention.

The printer 1 described in this embodiment is a device which is connected to the host computer 6 as the external device and prints (records) text or image on a recording medium based on data input from the host computer 6. In this embodiment, as an example, a thermal printer which accommodates a thermal roll paper as a recording medium in a main body and prints text or image by applying heat to the recording surface of the thermal roll paper by a print head 17 having a heating element will be described.

The printer 1 includes a print engine 10, a main interface substrate 20 that controls communication between the printer 1 and the host computer 6 externally connected to the printer 1, and a sub substrate 30.

The print engine 10 includes a control unit 11 controlling respective units of the printer 1, a nonvolatile memory 12 storing programs executed by the control unit 11 and various kinds of data, a buffer memory 13 temporarily storing the data received from the host computer 6, and a driver (drive circuit) 14 executing printing by controlling the drive unit provided in the printer 1. To the control unit 11, a paper end sensor 15 and a paper residual amount sensor 16 are connected. The nonvolatile memory 12, specifically, is configured by a semiconductor memory device such as an EEPROM or a flash memory. The buffer memory 13 is a volatile memory that stores commands or data input from the main interface substrate 20 to the control unit 11 in the order of their reception.

The printer 1 includes a print head 17 for printing on the thermal roll paper, a transport motor 18 rotating a transport roller (not illustrated) that transports the thermal roll paper, and a cutter unit 19 cutting the thermal roll paper after printing.

The driver 14 is connected to the transport motor 18 and the cutter unit 19 provided in the printer 1. The driver 14 transports the thermal roll paper as long as that required by outputting a drive current and a drive pulse to the transport motor 18, and controls the cutter unit 19 to cut the thermal roll paper in a predetermined timing by outputting the drive current to the cutter unit 19.

Also, the paper end sensor 15 connected to the control unit 11 detects the existence/nonexistence of the thermal roll paper on a transport path of the thermal roll paper, and the paper residual amount sensor 16 is a sensor that detects whether the residual amount of the thermal roll paper is smaller than a predetermined amount. The respective detected values are output to the control unit 11.

The control unit 11 executes the program read from the nonvolatile memory 12, performs a turn-on/off control of the respective heating elements by driving a head driver (not illustrated) connected to the print head 17 based on the command and data stored in the buffer memory 13 and the detected values of the paper end sensor 15 and the paper residual amount sensor 16, and performs the printing on the thermal roll paper by operating the transport motor 18 and the cutter unit 19 through control of the driver 14.

The control unit 11 is connected to the main controller 21 mounted on the main interface substrate 20. A sub controller 22 and a USB controller 23 are connected to this main controller 21. The sub controller 22 controls communication through the various interfaces such as RS-232C interface or IEEE 1284 parallel interface. In addition, the USB controller 23 controls communication through USB (Universal Serial Bus), and serves as a slave device (a servant device) with respect to the host computer 6 (a master device).

A conversion circuit 31 mounted on the sub circuit 30 is further connected to the sub controller. The conversion circuit 31 is connected to a connector 41 mounted on the sub substrate 30 and performs signal conversion between the connector 41 and the sub controller 22. That is, the sub controller 22 is compatible with communication of versatile signal, such as a synchronous serial communication. The conversion circuit 31 conforms to a specific communication method together with the connector 41 and performs conversion between this communication method and a communication method of the versatile signal with which the sub controller 22 is compatible. Sub controller 22 side only has to be compatible with one communication method. A common main interface substrate 20 can be used.

A plurality of types of the sub substrate 30 can be connected to the sub controller 22. Specifically, there are a sub substrate 30 conforming to the RS-232C interface standard, a sub substrate 30 conforming to the IEEE 1284 parallel interface standard, a sub substrate 30 being adaptable to the 100 BASE-T, and a sub substrate 30 being compatible with the wireless LAN (IEEE 802.X). Each sub substrate 30 is equipped with the conversion circuit 31 which performs signal conversion between a communication method with which the sub substrate 30 is compatible and the communication method with which the sub controller 22 compatible. Thus, by replacing the sub substrate 30 connected to the sub controller 22, it is possible to provide various types of interface on the sub controller 22.

In this embodiment, the sub substrate 30 equipped with the connector 41 being compatible with RS-232C interface and the conversion circuit 31 is mounted on the printer 1, as an example. The connector 41 conforming to the RS-232C standard is exposed to the outside of the printer 1 and the host computer 6 can be connected to this connector 41 through a serial cable 51.

In addition, a connector 42 which is exposed to the outside of the printer 1 is connected to the USB controller 23. The connector 42 conforms to the USB standard and for example, provided with two power terminals and two data terminals (D+, D−). The host computer 6 can be connected to this connector 42 through a USB cable 52.

The connections to the connector 41 and the connector 42 are exclusive and selective. It is impossible to connect the host computer 6 to both the connector 41 and the connector 42 at the same time. Accordingly, in FIG. 1, the host computer 6 connected to the connector 41 is denoted by a solid line and the host computer 6 connected to the connector 42 is denoted by an imaginary line.

In this manner, in the printer 1, the host computer 6 provided with the RS-232C connector can be connected to the connector 41 through the serial cable 51 and the host computer 6 provided with the USB connector can be connected to the connector 42 through the USB cable 52.

When the host computer 6 is connected to the connector 41, the printer 1 executes communication control with the host computer 6 with functions of the main controller 21 and the sub controller 22 and causes the print engine 10 to perform printing in accordance with a command and data sent from the host computer 6.

In addition, when the host computer 6 is connected to the connector 42, the printer 1 detects the host computer by a voltage or a signal in a specific terminal with a function of the USB controller 23, executes communication control with the host computer 6 with functions of the main controller 21 and the USB controller 23, and causes the print engine 10 to perform printing in accordance with a command and data sent from the host computer 6.

The USB controller 23 and the connector 42 corresponds to an interface with detecting function of the present invention and the sub controller 22 and the connector 41 corresponds to the other interface.

When the printer 1 is powered on by an operation of a power switch (not shown), the printer executes an operation of detecting whether the host computer 6 is connected to the connectors 41, 42. Since the connector 42 is connected to the USB controller 23, the connection of the host computer can be automatically detected by a prescribed procedure of the USB standard. To the contrary, since the connector 41 is connected to the sub controller 22 which processes the versatile signal which also corresponds to a legacy interface, it is impossible to automatically detect that the host computer 6 is connected to the connector 41. Specifically, it is detected that the host computer 6 is connected only when a request command for a status report, an instruction command of printing or print job data is input from the host computer 6. The printer 1 provided with two interfaces having different functions detects the host computer 6 as explained below.

Figure 2:
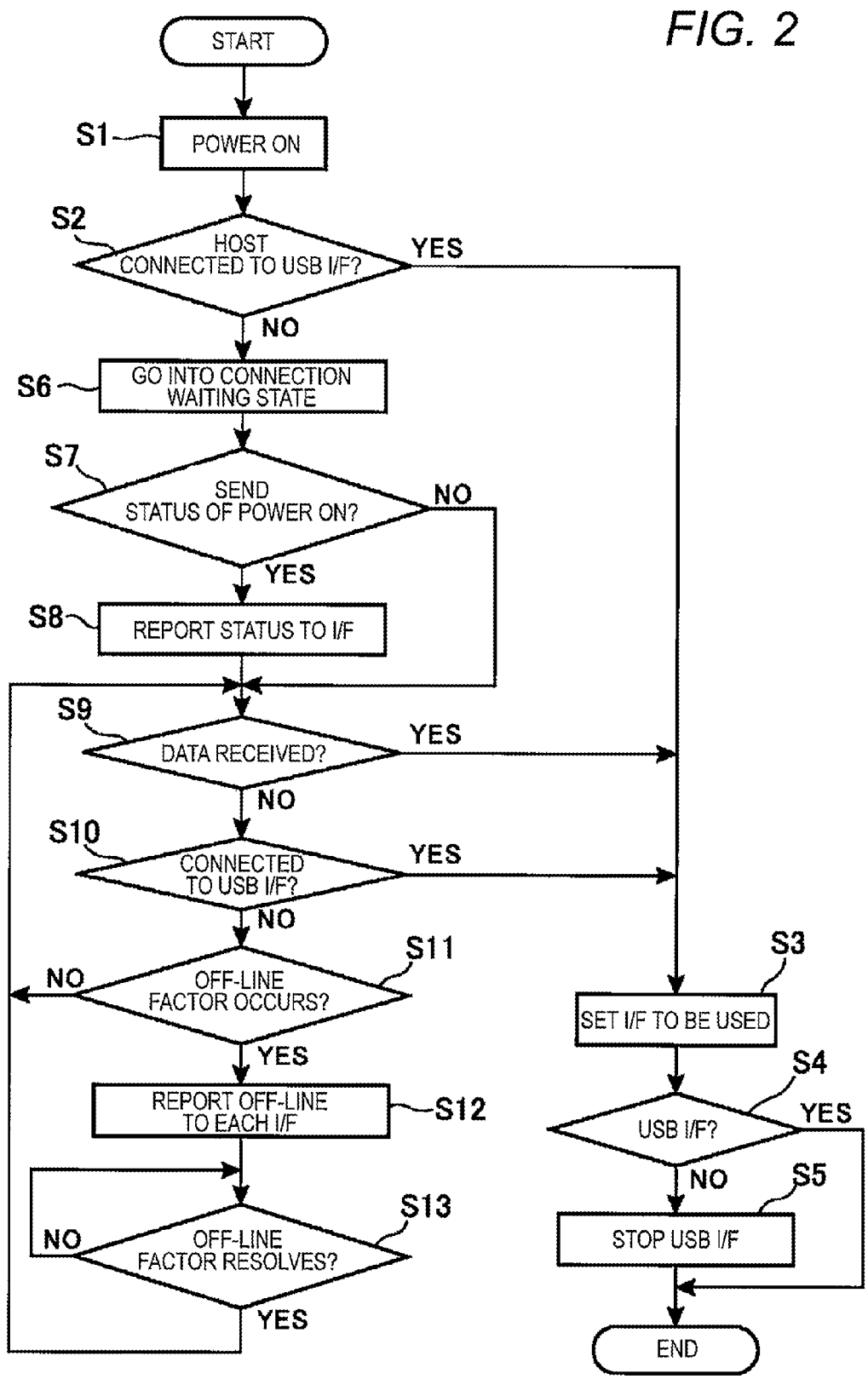
FIG. 2 is a flow chart illustrating an operation of the printer.

FIGS. 2 to 4C are flow charts illustrating an operation of the printer 1. In particular, FIG. 2 illustrates an operation regarding the detection of the host computer 6 by the main controller 21. In FIGS. 2 to 4C, the main controller 21 corresponds to the control unit of the present invention.

When the printer 1 is powered on (Step S1), the main controller 21 determines whether the host computer 6 connected to the connector 42 is detected by the function of the USB controller 23 (Step S2). As discussed later, the USB controller 23 has a function of detecting existence or nonexistence of the connection of the host computer 6 at the time of the power activation. Thus, when the host computer 6 is connected to the connector 42, it is determined at Step S2.

In a case where the host computer 6 is connected to the connector 42 (Step S2; Yes), the main controller 21 sets the connector 42 as an interface used in the printer 1 (Step S3), and determines whether the set interface is the USB interface (USBI/F) (Step S4). When an interface other than the USB interface is set (Step S4; No), the main controller 21 stops the USB controller 23 (Step S5), and ends the process regarding the connection detection of the host computer 6. When the USB controller 23 is set as the interface to be used (Step S4; Yes), the main controller 21 directly ends the process regarding the connection detection of the host computer 6.

On the other hand, when the host computer 6 is not connected to the connector 42 (Step S2; No), the main controller 21 keeps the USB controller 23 active, and goes into a connection waiting state in which the connection by the sub controller 22 is allowed (Step S6). In this connection waiting state, the main controller 21 determines whether it is set to send a status report indicating that the printer 1 is powered to the host computer (Step S7). When it is set to send the status report to the host computer (Step S7; Yes), the main controller 21 sends the status report through an interface other than the USB controller 23, i.e. through the sub controller 22 (Step S8), and determines whether to receive or a command from the host computer 6 through the connector 41 (Step S9). Here, the data or the command sent from the host computer 6 is, for example, a request command for the status report, an instruction command of the printing execution, and print job data.

When receiving the data or the command from the host computer 6 through the connector 41 (Step S9; Yes), the main controller 21 goes into Step S3 to set the connector 42 (the sub controller 22) as the interface to be used, then goes into Steps S4 and S5 to step the USB controller 23 and ends this process.

When not receiving the data or the command from the host computer 6 (Step S9; No), the main controller 21 determines whether to detect the host computer 6 by the function of the USB controller 23, i.e. whether the host computer 6 is connected to the connector 42 (Step S10). When the host computer 6 is connected (Step S10; Yes), the main controller 23 goes into Step 3.

When the host computer 6 is not connected to the connector 42 (Step S10; No), the main controller 21 determines whether an off line factor of the printer 1 occurs (Step S11). The off-line factor is, for example a factor contributing to a state where a cover of the main body of the printer 1 is opened or a state where a printing operation cannot be executed due to the detection of out-of-paper by the paper residual amount sensor 16. The printer 1 goes into an off-line state due to the occurrence of the off-line factor.

When the off-line factor occurs (Step S11; Yes), the main controller 21 sends an off-line report indicative of the transition to the off-line state through the sub controller 22 and the USB controller 23 (Step S12), waits until the off-line factor resolves (Step S13), and returns to Step S9 when the off-line factor resolves to determine whether to receive the print job data from the host computer 6. When the off-line factor does not occur (Step S11; No), the main controller 21 returns to Step S9.

When receiving the job data at Step S9, the main controller goes into Step S3 to set the interface to be used.

By the above-described operation, the detection of the connection of the host computer 6 after the printer 1 is powered on, and when the host computer 6 is connected to one of the connectors 41, 42, the connection can be rapidly detected and the interface to be used can be set.

An operation executed when the host computer 6 is connected to the connector 42 and when the host computer 6 is connected to the connector 41 will be described in detail.

FIGS. 3A and 3B are flow charts illustrating an operation to detect the connection of the host computer in the printer 1, and an operation in which the USB controller 23 detects that the host computer 6 is connected to the connector 42. FIG. 3A illustrates the operation of the printer 1, FIG. 3B illustrates the operation of the host computer 6.

When the printer 1 is powered on (Step S21), the USB controller 23 detects a bus power voltage to the connector 42 (Step S22). When the host computer 6 is connected, a voltage of +5V is supplied from the host computer 6 through the USB cable 52 and USB controller 23 detects this voltage.

The USB controller 23 which detects the bus power voltage, goes into a state of the connection detection (Attached) (Step S23), and the attachment (the connection) of the slave device is detected in the host computer 6 (Step S31). Thereafter, the USB controller 23 goes into a power activation state, i.e., a state where a normal operation is allowed (Step S24) and the host computer 6 sends a reset signal to the printer 1 (Step S32).

The USB controller 23 receives the reset signal (Step S25), executes initialization of the communication state and sends the reset signal to the control unit 11 to initialize the operation regarding the printing by the printer 1 (Step S26). Thereafter, the USB controller 23 and the host computer 6 communicate setting values or the like with each other and executes configuration (Step S27, Step S33) and goes into a normal operation.

In addition, FIGS. 4A and 4B are flow charts illustrating an operation of detecting the connection of the host computer 6 in the printer 1 and an operation in which the main controller 21 detects that the host computer 6 is connected to the connector 41. FIG. 4A illustrates the operation of the printer 1 and FIG. 4B illustrates the operation of the host computer 6.

When the printer 1 is powered on (Step S41), the main controller 21 sends a status report of the power activation through the sub controller 22 (Step S42), determines existence or nonexistence of the off-line factor such as out-of-paper (Step S43), and sends the off-line report through the sub controller 22 when the off-line state occurs (Step S44). Thereafter, when the off-line factor resolves (Step S45; No), the main controller 21 sends an on-line report to the host computer 6 through the sub controller 22 (Step S46).

The host computer 6 receives the status report sent from the main controller 21 (Step S51), and when the off-line report and the on-line report are sent, the host computer 6 receives them (Steps S52, S53). The host computer 6 detects that the printer 1 is connected and is in the on-line state, and sends the job data including the command of the printing execution when a print job occurs (Step S54).

The main controller 21 receives the job data sent from the host computer 6 through the sub controller 22 (Step S47), the outputs the command and the data included in the job data to the print engine 10.

In this manner, when the host computer 6 is connected to the connector 41, since the printer 1 sends the status report, the off-line report or the on-line report to the host computer 6, the host computer 6 detects the printer 1, and then the print job data or the request data (command) for the status report or the like is sent from the host computer 6 in response the above reports. Thus, the main controller 21 can detect that the host computer 6 is connected to the connector 41 by receiving the data or the command sent from the host computer 6.

As described above, the printer 1 according to the first embodiment of the present invention comprises the connectors 41, 42 as a plurality of the interfaces to which the host computer 6 is connectable, exclusively selects one of these connectors 41, 42, and is configured to be communicatable with the host computer 6 connected to the selected interface. One of the connectors 41, 42 (here, the connector 42) is a USB connector capable of detecting the connection state of the host computer 6. When the host computer 6 is not connected to the connector 42 at the time of the power activation, the printer 1 goes into the connection waiting state in which the status report signal is sent from the connector 41 while keeping the connector 42 active. In this connection waiting state, the occurrence of the off-line state is reported to both the connector 42 and the connector 41 when the off-line factor occurs. Thus, in a case where the connector 42 having a function of detecting the connection state and the connector 41 not having a function of detecting the connection state are mounted, the connection can be rapidly detected after the power activation regardless of whether the host computer 6 is connected to the connector 42 or the connector 41. In addition, since the off-line is reported to all of the connectors when the off-line factor occurs before the connection of the host computer 6 is detected, the off-line can be reported to the host computer 6 even when the host computer 6 is connected but undetected. Accordingly, it is possible to avoid a situation in which the data is input from the host computer 6 in the off-line state and to reliably detect the connection after returning to the on-line state.

In addition, the printer 1 serves as the USB slave device when the host computer 6 is detected by the connection detecting function of the USB controller 23. When the USB controller 23 does not detect the host computer 6, the printer 1 reports the status through the connector 41 which does not have the connection detecting function. Thus, when the host computer 6 is connected to either the connector 41 or the connector 42, it is possible to rapidly detect the host computer 6 and start the operation under the control of the host computer 6.

Further, the data is input through the connector 41 in the connection waiting state, the connector 42 goes into the stop state from the active state. Accordingly, an unnecessary operation to keep the connector 42 active so as to detect the host computer 6 can be omitted and it is possible to make the operation effective.

Second Embodiment

Figure 5:
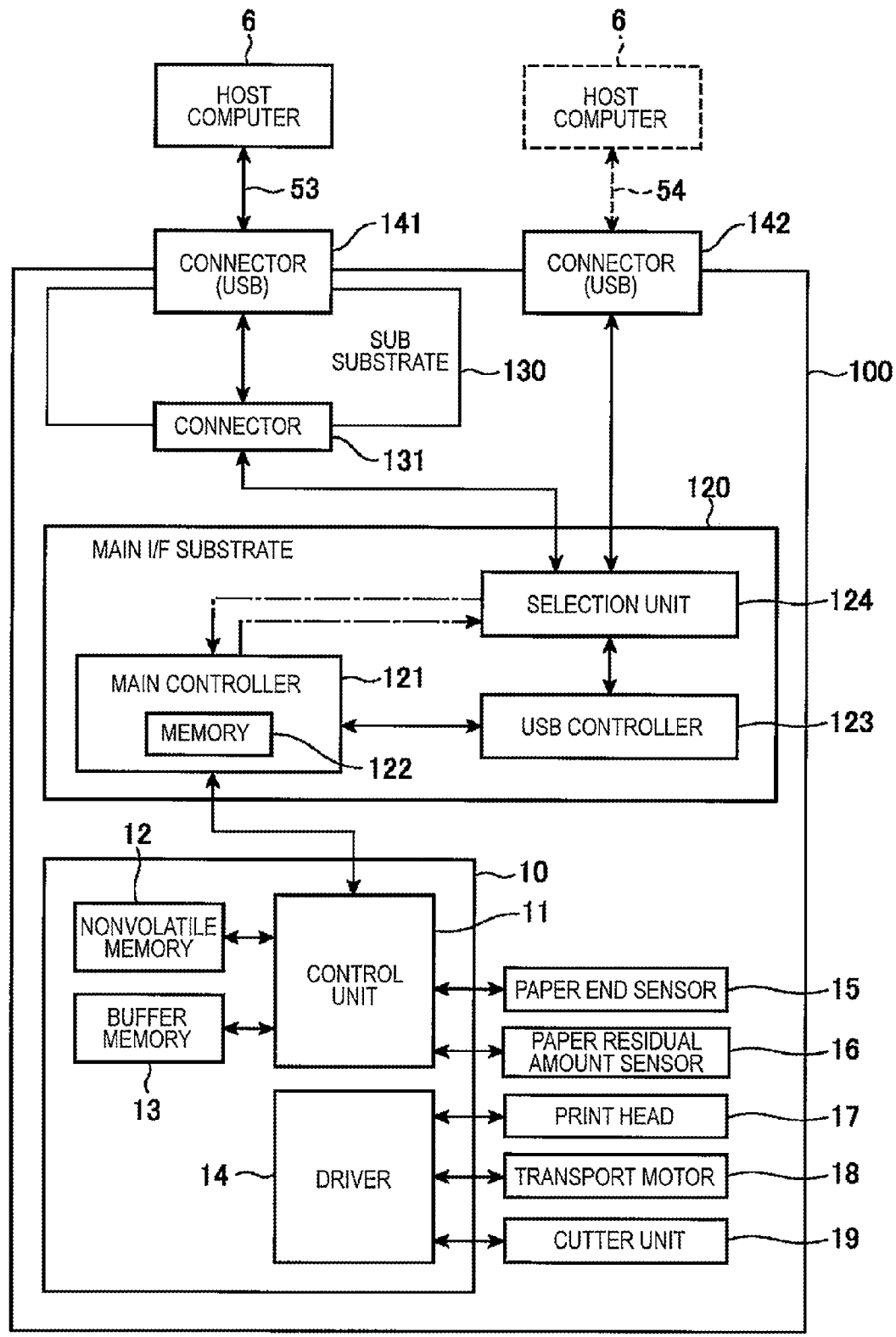
FIG. 5 is a block diagram illustrating a configuration of a printer according to a second embodiment of the present invention.

FIG. 5 is a block diagram illustrating the configuration of a printer 100 according to a second embodiment of the present invention.

As well as the printer 1 according to the first embodiment, the printer 100 is connected to the host computer 6 as the external device and prints (records) text or image on a recording medium. As well as the printer 1 according to the first embodiment, the printer 100 is, for example, a thermal printer which accommodates a thermal roll paper as a recording medium in a main body and prints text or image by applying heat to the recording surface of the thermal roll paper by a print head 17 having a heating element. In the second embodiment, the same symbols are applied to the respective parts similarly configured as the first embodiment and the description thereof will be omitted.

The printer 100 includes a print engine 10 that controls a printing operation, a main interface substrate 120 (the main substrate) that controls communication between the printer 100 and the host computer 6 externally connected to the printer 100 and a sub substrate 130 (the interface substrate). The control unit 11 is connected to the main controller 121 mounted on the main interface substrate 120. The main controller 121 is connected to the USB controller 123 and the selection unit 124, which are mounted on the main interface substrate 120 together with the main controller 121. The USB controller 123 controls the communication through the USB and serves as a slave device (a servant device) with respect to the host computer 6 (a master device).

The printer 100 is provided with two USB connectors: a connector (a part of second interface) 142 installed on a side surface of the printer 100 to be exposed to the outside and a connector (a part of first interface) 141 installed on a rear surface of the printer 100 to be exposed to the outside. These connectors 141 and 142 are provided with, for example, two power supply terminals and two data terminals (D+ and D−) based on the USB standard, and are connected to the host computer 6 through USB cables 53 and 54.

The connector 141 is installed on the sub substrate 130 that is connected to the main interface substrate 120 through the connector 131. The connector 141 is connected to the selection unit 124 installed on the main interface substrate 120 through the connector 131. Also, the connector 142 is directly connected to the selection unit 124.

The connectors 141 and 142 function as the first interface and the second interface in cooperation with the USB controller 123.

The selection unit 124 is interposed between the connectors 141 and 142 and the USB controller 123. The selection unit 124 selects any one of the connectors 141 and 142 and connects the selected connector to the USB controller 123 under the control of the main controller 121. The connection to the connectors 141 and 142 is performed exclusively and selectively, and thus it may not be possible to simultaneously connect both the connectors 141 and 142 to the host computer 6. Accordingly, in FIG. 5, the host computer 6 connected to the connector 141 is indicated by solid line and the host computer 6 connected to the connector 142 is indicated by imaginary line.

In the case where the host computer 6 is connected to the connectors 141 and 142, the communication control with the host computer 6 is performed by the function of the main controller 121, and the print is performed by the print engine 110 according to the command and data transmitted from the host computer 6. In this operation, the main controller 121 selects any one of the connectors 141 and 142 through the selection unit 124.

The main controller 121 is provided with a memory 122. The memory 122 is a storage unit for storing designation information for designating which of the connectors 141 and 142 is selected by the selection unit 124. The stored designation information is called a memory switch. The designation may be performed by a command from the host computer 6. In this case, it is necessary that the host computer 6 is connected to the connected on the previously selected side. After the designation by the command, communication from the designated connector becomes possible. The main interface substrate 120, in the case where both the connectors 141 and 142 are usable, connects the connector designated by the designation information of the memory 122 through the selection unit 124. A DIP switch may be mounted on the main interface substrate 120 to designate any one of the connectors 141 and 142. When power is supplied through manipulation of a power switch (not illustrated) of the printer 100, when a reset command is received from the host computer 6, or when a reset signal for instructing a reset is received from the host computer 6, the main controller 121 acquires the designation of the memory switch or a DIP switch, and designates any one of the connectors 141 and 142.

Also, the sub substrate 130 may be separated from the main body of the printer 100, and is electrically detachable with respect to the main interface substrate 120. Accordingly, the sub substrate 130 may not be connected during starting of the printer 100, and thus the printer 100 may be connectable to the host computer 6 only through the connector 142. In this case, the main controller 121, even if the connector 141 is designated by the designation information stored in the memory 122, can select the connector 142 that is the sole usable interface through the selection unit 124.

If the power is input by the manipulation of the power switch (not illustrated), the printer 100 operates to detect whether the host computer 6 is connected to the connectors 141 and 142. Since the connectors 141, 142 are connected to the USB controller 23, the connection of the host computer 6 can be automatically detected through the procedure prescribed in the USB standard.

Figure 6:
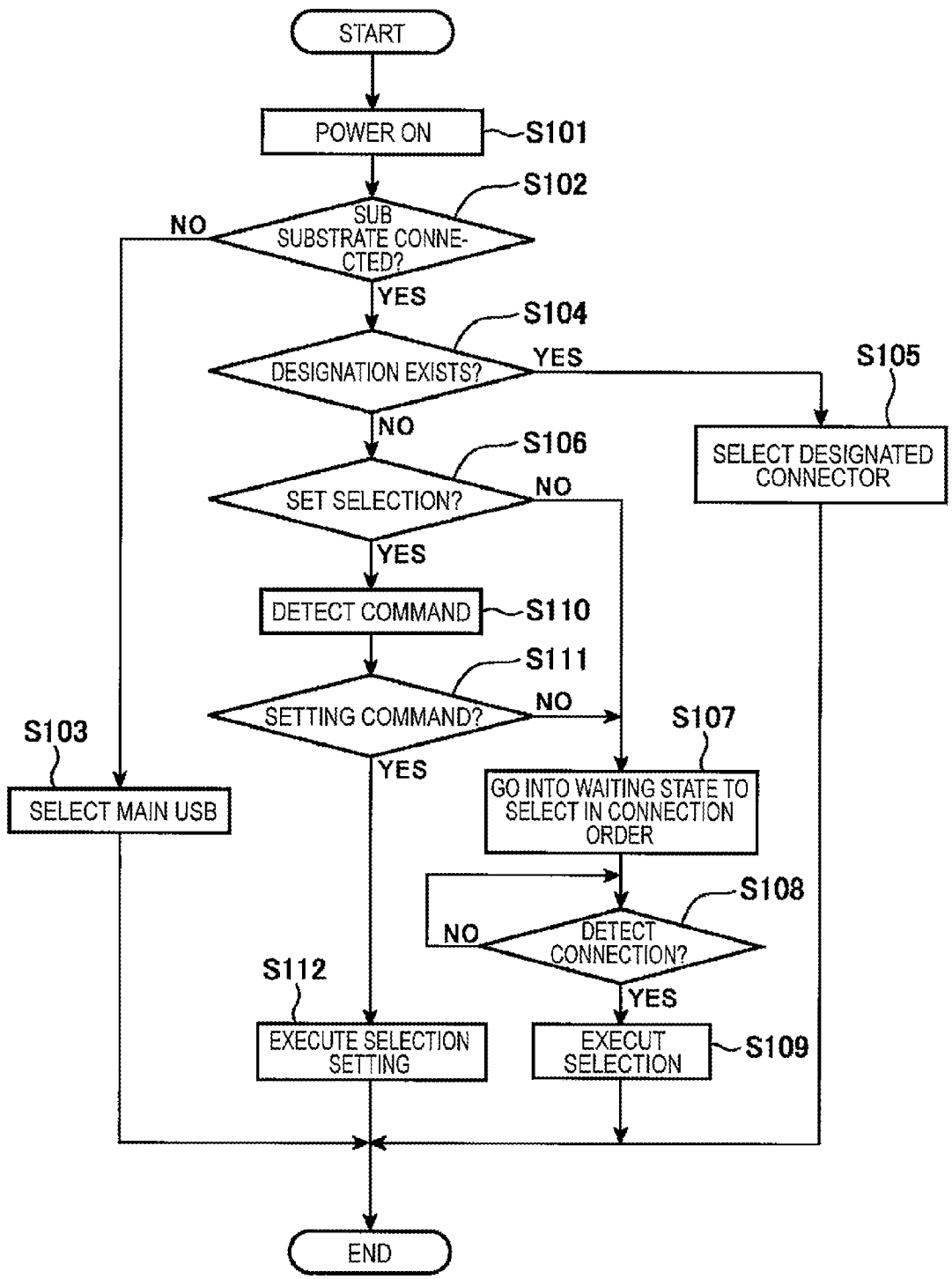
FIG. 6 is a flow chart illustrating an operation of the printer.

FIG. 6 is a flowchart illustrating the operation of a printer 100, and shows the operation until the selection unit 124 selects any one of the connectors 141 and 142 under the control of the main controller 121.

If the power of the printer 100 is input (Step S101), the main controller 121 determines whether the sub substrate 130 is connected to the printer 100 (Step S102). If the sub substrate 130 is not connected to the printer 100 (Step 102; No), the main controller 121 controls the selection unit 124 to select the connector 142 (Step S103), and goes to a state communicatable with the host computer 6 to end the process.

If the sub substrate 130 is connected to the printer 100 (Step S102; Yes), the main controller 121 determines whether any one of the connectors 141 and 142 is designated as the side that is preferentially selected by the designation information stored in the memory 122 (Step S104). If any one connector is designated by the designation information (Step S104; Yes), the main controller 121 selects the connector designated by the designation information between the connectors 141 and 142 (Step S105), and goes to a state communicatable with the host computer 6 to end the process.

Also, if the connector is not designated by the designation information stored in the memory 122 (Step S104; No), the main controller 121 determines whether to perform setting for the designation of the connectors 141 and 142 (Step S106). That is, the main controller determines whether to store new designation information in the memory 122 or to update the designation information. Whether to perform the setting may be designated by the designation information pre-stored in the memory 122.

Here, in the case where the setting is not performed (Step S106; No), the main controller 121 goes to a standby state for preferentially selecting the connector which has been first connected to the host computer 6 (Step S107), and waits for until the connection of the host computer 6 is detected (Step S108). If it is detected that the host computer 6 is connected to any one connector (Step S108; Yes), the main controller 121 controls the selection unit 124 to select the connector on the side where the connection is detected (Step S109), and goes to a state communicatable with the host computer 6 to end the process.

If the setting for the designation of the connector is performed in the printer 100 (Step S106; Yes), the main controller 121 detects a command input from the host computer 6 (Step S110), and determines whether the detected command is a command for setting (Step S111). If the detected command is not the command for setting (Step S112; No), the processing proceeds to step S107, while if the detected command is the command for setting (Step S112; Yes), the main controller 121 generates or updates the designation information according to the command to store the result in the memory 122, controls the selection unit 124 to select the connector on the side designated by the designation information (Step S112), and goes to the state communicatable with the host computer 6 to end the process.

Figure 7:
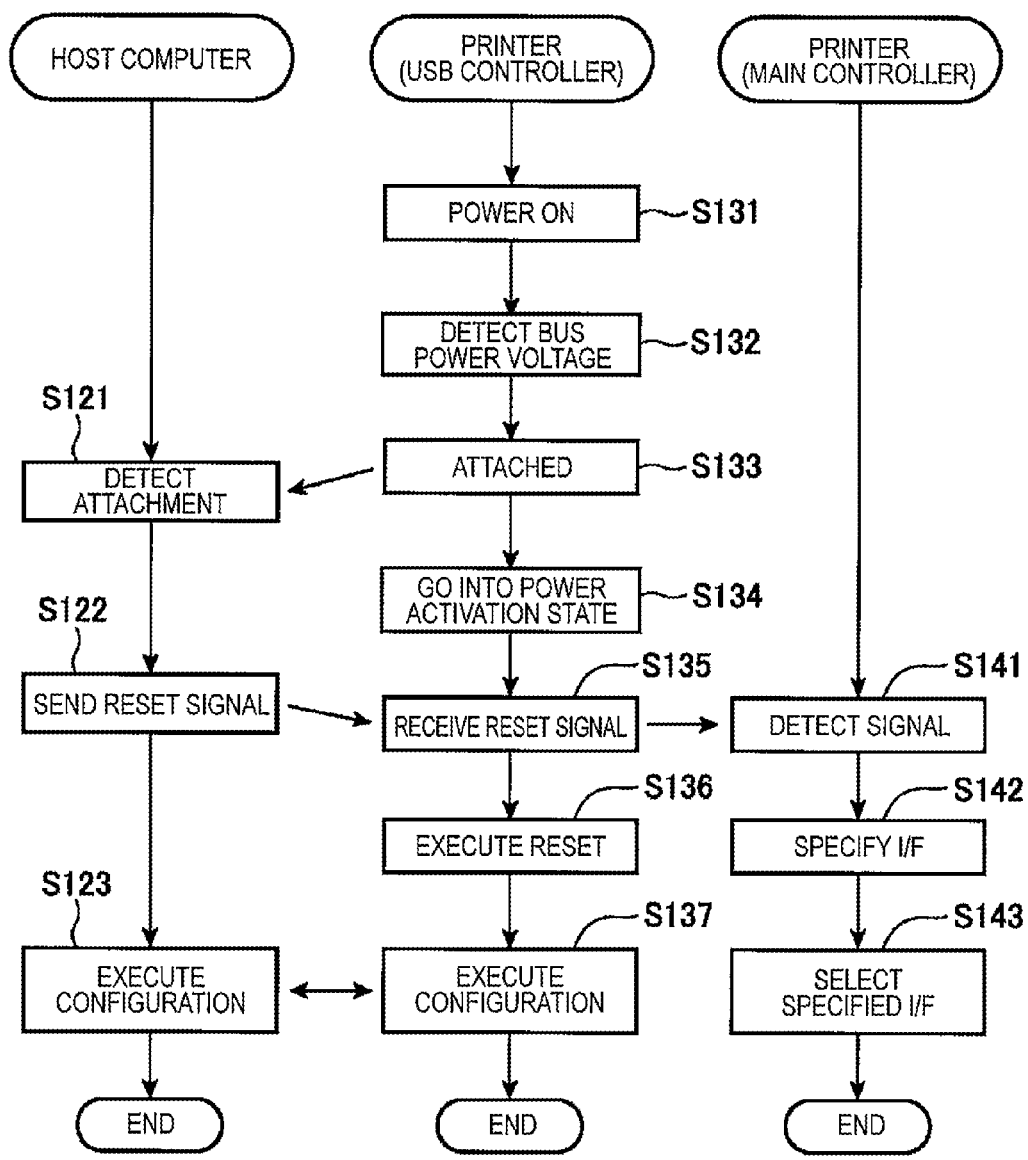
FIGS. 7A to 7C are flow charts illustrating an example of the operation of the printer.

FIGS. 7A to 7C are flow charts illustrating an example of an operation of a printer 100. FIG. 7A shows the operation of the host computer 6, FIG. 7B shows the operation of the USB controller 123, and FIG. 7C shows the operation of the main controller 121.

The USB controller 123, if the power of the printer 100 is turned on (Step S131), detects a bus power voltage of the connectors 141 and 142 (Step S132). In Step S132, the voltage and signal are input from both of the connectors 141 and 142 to the USB controller 123 through the selection unit 124, and the bus power voltage is applied to the USB controller 123 even if the host computer 6 is connected to any one of the connectors 141 and 142.

In the case where the host computer 6 is connected to any one of the connectors 141 and 142, a voltage of +5V is supplied from the host computer 6 through the USB cables 53 and 54, and thus the USB controller 123 detects this voltage.

The USB controller 123, which has detected the bus power voltage, goes to a connection (attachment) detected state (Step S133), and the host computer 6 detects the connection (attachment) of the slave device (Step S121). Thereafter, the USB controller 123 goes to a power input state, i.e. a typical operation state (Step S134), and the host computer 6 transmits a reset signal to the printer 100 (Step S122).

Here, the main controller 121 detects that the reset signal has been input from any one of the connectors 141 and 142 with respect to the USB controller 123 (Step S141), and specifies which of the connectors 141 and 142 is the connector from which the reset signal has been input (Step S142). Also, the main controller 121 makes the selection unit 124 to select the connector on the specified side (Step S143).

Accordingly, the connector to which the host computer 6 is connected through the selection unit 124 is connected to the USB controller 123.

The USB controller 123 receives the reset signal input from the host computer 6 (step S135), performs initialization of the communication state, and initializes the print operation of the printer 1 by transmitting a reset signal to the control unit 111 (Step S136). Thereafter, the USB controller 23 and the host computer 6 perform configuration by mutually transmitting/receiving the set values and the like (Steps S123 and S137), and then perform the typical operations.

As described above, according to the printer 100 of the second embodiment of the present invention, the printer 100 that is connectable to the host computer 6 includes the main interface substrate 120, the sub substrate 130 detachably connected to the main interface substrate 120, a connector 141 installed on the sub substrate 130 and connectable to the host computer 6, the connector 142 installed on the main interface substrate 120 and connectable to the host computer 6, the selection unit 124 selecting the interface of any one of the connector 141 on the side of the sub substrate 130 and the connector 142 on the side of the main interface substrate 120, and the print engine 110 transmitting/receiving information with the host computer 6 through the interface selected by the selection unit 124, wherein at least one of the connector 141 and the connector 141 are configured so as to be detectable of the connection state to the host computer 6, wherein the selection unit 124, under the control of the main controller 121, selects the pre-designated interface or preferentially selects the interface in which the connection to the host computer 6 has been detected among the connector 141 and the connector 142.

Accordingly, in the configuration where the connector 141 that is connectable to the host computer 6 is provided on the sub substrate 130 and the connector 142 is provided on the side of the main interface substrate 120, the selection unit 124, which selects either of the connectors, selects the pre-designated connector or preferentially selects the connector in which the connection to the host computer 6 has been detected when the connector is detectable of the connection state to the host computer 6. Accordingly, since the designated connector or the connector on the side where the user has actually connected to the host computer 6 is selected by using a function of the interface that is detectable of the connection state to the host computer 6, the connector (interface) on the necessary side can be rapidly and efficiently selected, and thus the communication with the host computer 6 can be performed.

Also, since the printer 100 is provided with the memory 122 for storing the designation information for designating any one connector between the connectors 141 and 142, and the main controller 121 that controls the selection unit 124 acquires the designation information of the memory 122 when the power of the printer 100 is input, when the reset command or the reset signal is received from the host computer 6, or when the reset signal is received from the host computer 6, and selects the designated connector based on the designation information, it is possible to easily designate the interface to be selected through the designation information.

Further, if a specified command that includes the information for designating any one interface is received from the host computer 6, the selection unit 124 selects the interface designated by the specified command, and thus the connector to be selected can be easily designated by transmitting the command from the host computer 6.

Also, even in the case where the selection unit 124 is pre-designated to select the connector 141 based on the designation information of the memory 122 under the control of the main controller 121 in the printer 100, the connector 142 is selected if the sub substrate 130 is not connected to the main interface substrate 120, and thus even in the case where the sub substrate 130 is not connected due to the maintenance circumstances or an operational error, the communication can be performed by connecting the host computer 6 by the connector 142. Accordingly, in the case where the selection of the designated interface is not possible, another interface is selected regardless of the designation, and thus the possibility of connection to the external device is constantly maintained.

Also, in the printer 100, since the connectors 141 and 142 are all USB connectors that can detect the connection state with the host computer 6 and the selection unit 124 first selects the connector in which the connection to the host computer 6 has been detected between the connectors 141 and 142, the connector can be rapidly selected, and thus the communication with the host computer 6 becomes possible.

In the second embodiment of the present invention, a method of storing the designated information in the memory 122 has been described as the method of pre-designating the connectors 141 and 142 preferentially selected. However, for example, a DIP switch for indicating the preferentially selected connector may be installed and by selecting the DIP switch, any one of the connectors 141 and 142 may be designated. In this case, the connector is designated according to the physical state of the switch. By manually manipulating the physical switch of the printer 100 as viewing the state of the switch with eyes, the connectors 141 and 142 can be easily designated.

Also, the detailed configuration of the selection unit 124 is not specifically limited, and the selection unit 124 may be implemented by a hardware circuit or may be virtually implemented by software.

Figure 8:
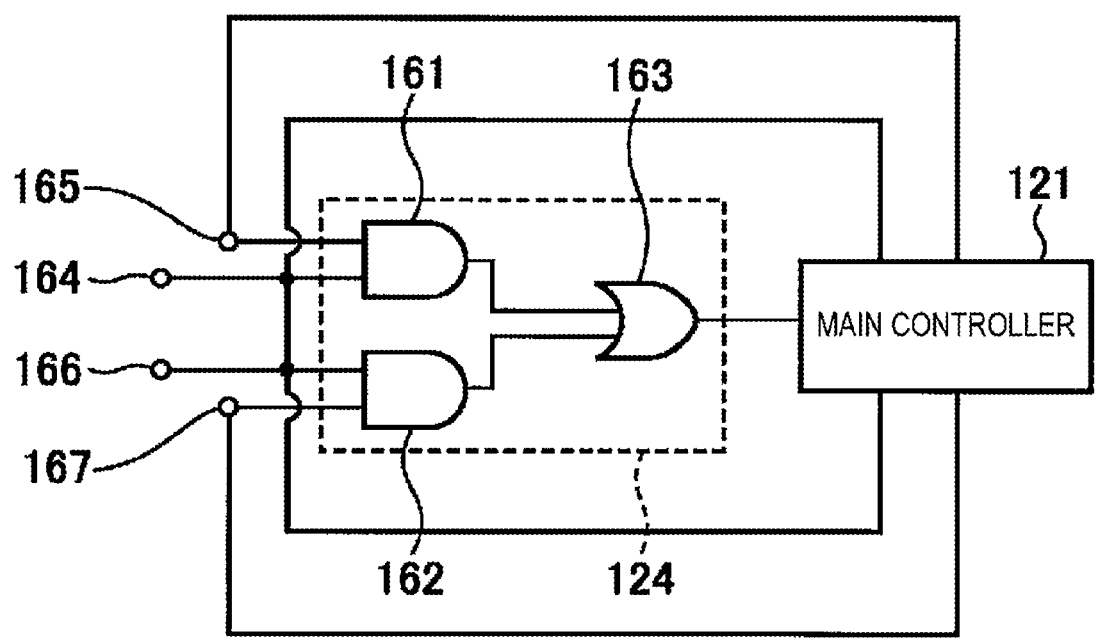
FIG. 8 is a diagram illustrating a specific configuration example of a selecting unit.

FIG. 8 is a diagram illustrating a detailed configuration example of a selection unit 124. As illustrated in FIG. 8, the selection unit 124 can be configured by a circuit indicated by gate devices 161, 162, and 163. The gate device 161 constituting the logical configuration of the selection unit 124 is an AND gate the output of which goes to a high level when inputs of input terminals 164 and 165 coincide with each other, and the gate device 162 is an AND gate the output of which goes to a high level when inputs of input terminals 166 and 167 coincide with each other. Also, the gate device 163 is an OR gate which outputs a high-level output when either of outputs of the gate devices 161 and 162 goes to a high level.

The connector 141 is connected to the input terminal 164, and the connector 142 is connected to the input terminal 166. Also, the main controller 121 is connected to the input terminals 165 and 167, and the main controller 121 can select the inputs of the input terminals 165 and 167.

In the initial state, i.e. in a state where the selection unit 124 selects neither of the connectors 141 and 142, the inputs of the input terminals 165 and 167 are kept at a high level by the main controller 121. If the host computer 6 is connected to the connector 141 and the input of the input terminal 164 goes to a high level, the output of the gate device 161 is changed from a low level to a high level. Accordingly, the output of the device 163 is changed to a high level, and the main controller 121 detects the connection of the host computer 6. Here, the main controller 121 changes the output to the input terminal of the gate device (here, gate device 162) on the side where its output is at a low level between the gate devices 161 and 162 to a low level. Accordingly, the output of the device 162 is kept at a low level. Also, the gate device 161, the output of which has been changed to a high level, changes its output so that its output becomes equal to the signal input from the input terminal 164. That is, a signal is output from the connector, to which the signal from the host computer 6 has been input, through the device 163. As described above, by the hardware circuit configuration, the function of the selection unit 124 that selects the connector under the control of the main controller 121 can be implemented. According to the configuration of FIG. 8, the output of the device 163 is input to the main controller 121.

The above-described embodiments are examples to which the present is applied, and thus the present invention is not limited thereto. For example, although in the above-described embodiments, it is exemplified that the connector 142 is configured as a USB interface and the connector 141 is configured as a legacy interface, the present invention is not limited thereto. For example, a plurality of legacy interfaces may be installed, and IEEE1394 interfaces may be installed as the interfaces having the detection function. The number of interfaces and the types thereof are not specifically limited.

Also, the recording device to which the present invention can be applied is not specifically limited, and it is sufficient if it is a printer that can control the recording speed onto the recording medium. For example, it can be applied to a dot-impact printer, an ink jet printer, a dye sublimation printer, a laser printer, and the like, and further to a printer built in another device, and its application is not limited. The connector 42 and 142 can be installed on the main interface substrate 20 and 120.

What is claimed is:

1. An electronic device which is connectable to an external device, comprising:
   a main substrate;
   an interface substrate which is detachably connected to the main substrate;
   a first interface which is installed on the interface substrate, the first interface which is connectable to the external device;
   a second interface which is installed on the main substrate, the second interface which is connectable to the external device,
   a selection unit configured to select one interface of the first interface and the second interface;
   a communication unit configured to communicate information with the external device through the interface selected by the selection unit; and
   a control unit,
   wherein the second interface is configured to detect a connection state to the external device and the first interface is not configured to detect the connection state to the external device,
   wherein when the electronic device is powered on, the control unit determines whether the second interface detects a connection to the external device, and then the selection unit selects the second interface if the controller determines that the second interface detects the connection to the external device while the controller goes into a connection waiting state if the controller determines that the second interface does not detect the connection to the external device,
   wherein when the controller is in the connection waiting state, the selection unit selects the second interface in a case where the second interface detects the connection to the external device and the first interface does not receive data from the external device,
   wherein when the controller is in the connection waiting state, the selection unit selects the first interface in a case where the first interface receives data from the external device and the second interface does not detect the connection to the external device,
   wherein, once the selection unit selects one interface of the first interface and the second interface, the selection is not changed until the electronic device is powered off.

2. The electronic device according to claim 1, wherein when the controller is in the connection waiting state, the control unit reports status information including information regarding an off-line factor through both of the first interface and the second interface in a case where the off-line factor occurs in the electronic device before the selection unit selects one of the first interface and the second interface.

3. The electronic device according to claim 1,
wherein the electronic device is a printer,
wherein the external device is a computer, and
wherein when the selection unit selects the first interface, the communication unit stops the second interface from detecting the connection state to the external device.

4. The electronic device according to claim 1, wherein the second interface is a USB interface and the first interface is an interface other than a USB interface.

5. The electronic device according to claim 4, wherein the first interface is an RS232C interface.

6. A method of controlling an electronic device which is connectable to an external device, the electronic device including: a main substrate; an interface substrate which is detachably connected to the main substrate; a first interface which is installed on the interface substrate, the first interface which is connectable to the external device; a second interface which is installed on the main substrate, the second interface which is connectable to the external device, a selection unit configured to select one interface of the first interface and the second interface; a communication unit configured to communicate information with the external device through the interface selected by the selection unit; and a control unit, wherein the second interface is configured to detect a connection state to the external device and the first interface is not configured to detect the connection state to the external device, the method comprising:
 when the electronic device is powered on, determining, by the control unit, whether the second interface detects a connection to the external device;
 if the control unit determines that the second interface detects the connection to the external device, selecting, by the selection unit, the second interface;
 if the control unit determines that the second interface does not detect the connection to the external device, going, in the control unit, into a connection waiting state;
 in the connection waiting state, selecting, by the selection unit, the second interface in a case where the second interface detects the connection to the external device and the first interface does not receive data from the external device;
 in the connection waiting state, selecting, by the selection unit, the first interface in a case where the first interface receives data from the external device and the second interface does not detect the connection to the external device; and
 communicating, by the communication unit, information with the external device through the selected interface,
 wherein, once the selection unit selects one interface of the first interface and the second interface, the selection is not changed until the electronic device is powered off.

7. The method according to claim 6, further comprising:
 in the connection waiting state, reporting, by the control unit, status information including information regarding an off-line factor through both of the first interface and the second interface in a case where the off-line factor occurs in the electronic device before the selection unit selects one of the first interface and the second interface.

8. The method according to claim 6,
wherein the electronic device is a printer,
wherein the external device is a computer, and
wherein the method further comprising when the selection unit selects the first interface, stopping, by the communication unit, the second interface from detecting the connection state to the external device.

9. The method according to claim 6, wherein the second interface is a USB interface and the first interface is an interface other than a USB interface.

10. The method according to claim 9, wherein the first interface is an RS232C interface.

* * * * *